(12) United States Patent
Fujii

(10) Patent No.: US 9,659,714 B2
(45) Date of Patent: May 23, 2017

(54) SOLID ELECTROLYTIC CAPACITOR INCLUDING INSULATING SUBSTRATE HAVING RECESSED SURFACE

(71) Applicant: Panasonic Intellectual Property Management Co., Ltd., Osaka (JP)

(72) Inventor: Eizo Fujii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 31 days.

(21) Appl. No.: 14/663,411

(22) Filed: Mar. 19, 2015

(65) Prior Publication Data

US 2015/0194267 A1 Jul. 9, 2015

Related U.S. Application Data

(63) Continuation of application No. PCT/JP2013/005716, filed on Sep. 26, 2013.

(30) Foreign Application Priority Data

Sep. 28, 2012 (JP) ................. 2012-217239

(51) Int. Cl.
*H01G 9/012* (2006.01)
*H01G 9/15* (2006.01)
(Continued)

(52) U.S. Cl.
CPC .............. *H01G 9/012* (2013.01); *H01G 2/06* (2013.01); *H01G 9/048* (2013.01); *H01G 9/10* (2013.01);
(Continued)

(58) Field of Classification Search
CPC .......... H01G 9/012; H01G 9/10; H01G 9/048; H01G 9/15; H01G 9/08; H01G 2/06; H01G 2009/0014
See application file for complete search history.

(56) References Cited

U.S. PATENT DOCUMENTS

| | | | |
|---|---|---|---|
| 7,835,138 B2 | 11/2010 | Yamashita et al. | |
| 2004/0022011 A1* | 2/2004 | Shimoda | H01G 9/042 361/523 |

(Continued)

FOREIGN PATENT DOCUMENTS

| | | |
|---|---|---|
| CN | 101286417 | 10/2008 |
| CN | 102610400 | 7/2012 |

(Continued)

OTHER PUBLICATIONS

International Search Report of PCT application No. PCT/JP2013/005716 dated Nov. 5, 2013.

(Continued)

*Primary Examiner* — David M Sinclair
(74) *Attorney, Agent, or Firm* — McDermott Will & Emery LLP

(57) ABSTRACT

A solid electrolytic capacitor comprises insulating substrate having an upper surface and a lower surface, a capacitor element disposed on the upper surface, a positive electrode lead-out structure, a negative electrode lead-out structure, and an exterior body configured to cover the capacitor element on the upper surface. The capacitor element has a positive electrode member, a negative electrode member, and a dielectric member. The positive electrode lead-out structure has a positive electrode terminal formed on the lower surface of the insulating substrate and is electrically connected to the positive electrode member. The negative electrode lead-out structure has a negative electrode terminal formed on the lower surface of the insulating substrate and is electrically connected to the negative electrode member. The insulating substrate has a step portion made up of a recessed surface formed by recessing the upper surface and a projected surface formed by projecting the lower surface.

7 Claims, 5 Drawing Sheets

(51) Int. Cl.
*H01G 2/06* (2006.01)
*H01G 9/048* (2006.01)
*H01G 9/10* (2006.01)
*H01G 9/08* (2006.01)
*H01G 9/00* (2006.01)

(52) U.S. Cl.
CPC .............. *H01G 9/15* (2013.01); *H01G 9/08* (2013.01); *H01G 2009/0014* (2013.01)

(56) References Cited

U.S. PATENT DOCUMENTS

2007/0171598 A1* 7/2007 Ishizuka .............. H01G 9/06
361/523
2008/0089014 A1* 4/2008 Ishizuka .............. H01G 9/15
361/528
2009/0059479 A1 3/2009 Yamashita et al.
2009/0116173 A1* 5/2009 Shimizu ............... H01G 9/15
361/529
2012/0182668 A1* 7/2012 Kim .................... H01G 9/15
361/535
2012/0262847 A1* 10/2012 Kawai ................. H01G 9/012
361/540

FOREIGN PATENT DOCUMENTS

| JP | 2003-234251 | | 8/2003 |
| JP | 2005-217185 | | 8/2005 |
| JP | 2008-258602 | | 10/2008 |
| JP | 2008270317 A | * | 11/2008 |
| JP | 2010-287588 | | 12/2010 |
| JP | 2012222262 A | * | 11/2012 |

OTHER PUBLICATIONS

English Translation of Chinese Search Report dated Dec. 22, 2016 for the related Chinese Patent Application No. 201380050631.8.

* cited by examiner

SOLID ELECTROLYTIC CAPACITOR INCLUDING INSULATING SUBSTRATE HAVING RECESSED SURFACE

RELATED APPLICATIONS

This application is a Continuation of International Application No. PCT/JP2013/005716, filed on Sep. 26, 2013, which in turn claims priority from Japanese Patent Application No. 2012-217239, filed on Sep. 28, 2012, the contents of all of which are incorporated herein by reference in their entireties.

TECHNICAL FIELD

The present disclosure relates to a solid electrolytic capacitor including a capacitor element disposed on an insulating substrate, and more particularly to a solid electrolytic capacitor in which an insulating substrate has a specific shape.

BACKGROUND

FIG. 8 is a cross-sectional view illustrating one example of a conventional solid electrolytic capacitor (refer to Unexamined Japanese Patent Publication No. 2010-287588, for example). As illustrated in FIG. 8, the solid electrolytic capacitor comprises capacitor element 101 and insulating substrate 102, and capacitor element 101 is disposed on an upper surface of insulating substrate 102. Insulating substrate 102 is flat as a whole. Capacitor element 101 has positive electrode lead 103 and positive electrode body 113 serving as a positive electrode member, negative electrode layer 104 and electrolytic layer 114 serving as a negative electrode member, and dielectric member 115 interposed between the positive electrode member and the negative electrode member. On the upper surface of insulating substrate 102, positive electrode connection member 105 and negative electrode connection member 106 are disposed separately from each other. On a lower surface of insulating substrate 102, positive electrode terminal 107 and negative electrode terminal 108 are disposed separately from each other. Furthermore, in insulating substrate 102, positive electrode conductive via 109 and negative electrode conductive via 110 are each formed in such a manner that a hole penetrating insulating substrate 102 from the upper surface to the lower surface is filled with a conductive material. Positive electrode conductive via 109 electrically connects positive electrode connection member 105 to positive electrode terminal 107, and negative electrode conductive via 110 electrically connects negative electrode connection member 106 to negative electrode terminal 108. Positive electrode connection member 105 and positive electrode lead 103 are electrically connected to each other with pillow member 111 interposed between positive electrode connection member 105 and positive electrode lead 103. Furthermore, negative electrode connection member 106 and negative electrode layer 104 are electrically connected to each other through conductive paste 112 formed between negative electrode connection member 106 and negative electrode layer 104. Capacitor element 101 is covered with exterior body 116 on the upper surface of insulating substrate 102.

SUMMARY

A solid electrolytic capacitor according to the present disclosure comprises an insulating substrate having an upper surface and a lower surface, a capacitor element disposed on the upper surface of the insulating substrate, a positive electrode lead-out structure, a negative electrode lead-out structure, and an exterior body configured to cover the capacitor element on the upper surface of the insulating substrate. The capacitor element has a positive electrode member, a negative electrode member, and a dielectric member. The positive electrode lead-out structure has an positive electrode terminal formed on the lower surface of the insulating substrate and is electrically connected to the positive electrode member of the capacitor element. The negative electrode lead-out structure has a negative electrode terminal formed on the lower surface of the insulating substrate and is electrically connected to the negative electrode member of the capacitor element. The insulating substrate has a step portion made up of a recessed surface formed by recessing the upper surface and a projected surface formed by projecting the lower surface.

The insulating substrate includes an electric insulating material and is provided separately from the exterior body.

According to the solid electrolytic capacitor, a component material of the exterior body is provided in an inside of the recessed surface. Therefore, the exterior body is thick above the step portion because the component material is provided in the inside of the recessed surface, so that a thermal stress and a mechanical stress generated when the solid electrolytic capacitor is mounted can be received by this thick portion. As a result, the solid electrolytic capacitor is hardly bent at the time of mounting, so that the internal electric connection defect is hardly generated.

According to a preferable specific configuration of the solid electrolytic capacitor, the step portion is formed in a part of the insulating substrate facing the capacitor element. Therefore, according to this configuration, the component material of the exterior body provided in the inside of the recessed surface in the step portion is partially interposed between the capacitor element and the insulating substrate, so that an amount of the component material is increased between the capacitor element and the insulating substrate. As a result, the capacitor element and the insulating substrate are highly adhered to each other.

According to another preferable specific configuration of the solid electrolytic capacitor, the positive electrode lead-out structure further has a first positive electrode connection member formed on the upper surface of the insulating substrate, and a second positive electrode connection member configured to electrically connect the first positive electrode connection member to the positive electrode terminal. In addition, the negative electrode lead-out structure further has a first negative electrode connection member formed on the upper surface of the insulating substrate, and a second negative electrode connection member configured to electrically connect the first negative electrode connection member to the negative electrode terminal. The recessed surface in the step portion is disposed a region between a formation region of the first positive electrode connection member and a formation region of the first negative electrode connection member, in the upper surface of the insulating substrate.

According to this configuration, the first positive electrode connection member and the first negative electrode connection member are not influenced by a level difference of the step portion. Thus, the step portion does not affect a preferable electrical connection between the first positive electrode connection member and the positive electrode member of the capacitor element, and a preferable electrical connection between the first negative electrode connection member and the negative electrode member of the capacitor element.

Furthermore, according to the other preferable specific configuration of the solid electrolytic capacitor, the projected surface in the step portion, a lower surface of the positive electrode terminal, and a lower surface of the negative electrode terminal are disposed in the same plane. According to this configuration, when the solid electrolytic capacitor is mounted on a wiring substrate, the thermal stress and mechanical stress can be received by the projected surface of the step portion that comes in contact with a surface of the wiring substrate. As a result, the solid electrolytic capacitor is hardly bent even at the time of mounting.

DESCRIPTION OF EMBODIMENT

Problems which exemplary embodiments of this disclosure intend to solve are as follows.

Figure 8:
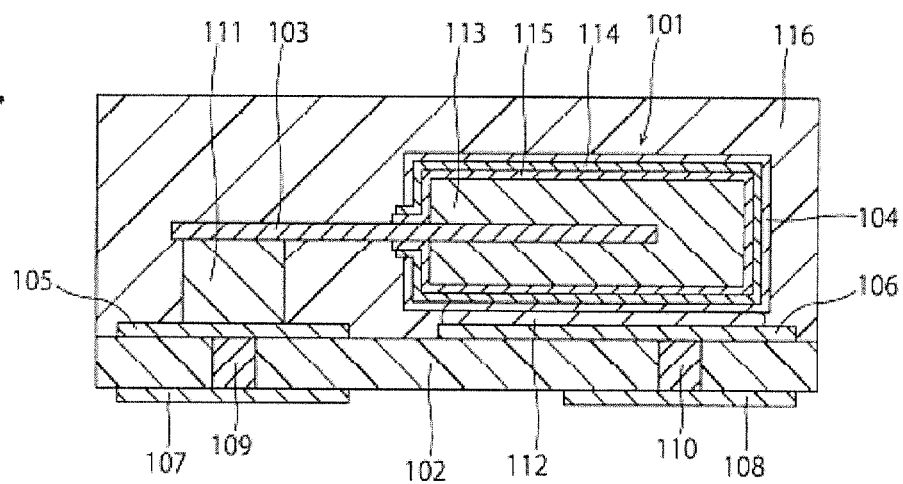
FIG. 8 is a cross-sectional view illustrating an example of a conventional solid electrolytic capacitor.

The conventional solid electrolytic capacitor illustrated in FIG. 8 is likely to be bent by a thermal stress and a mechanical stress generated when it is mounted on a wiring substrate such as a mother board. Therefore, an electrical connection defect in the solid electrolytic capacitor is likely to be generated at the time of mounting. More specifically, the electrical connection defect is likely to be generated between positive electrode lead 103 and pillow member 111, between pillow member 111 and positive electrode connection member 105, and between negative electrode layer 104 and negative electrode connection member 106.

Thus, the present disclosure provides a solid electrolytic capacitor that hardly generates an internal electrical connection defect at a time of mounting.

Figure 1:
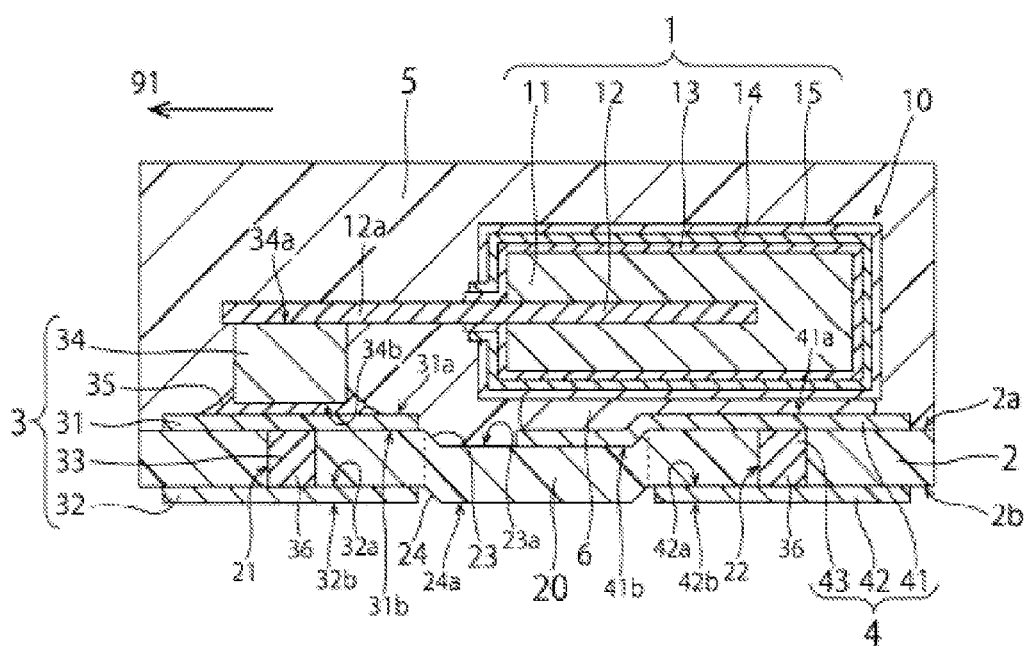
FIG. 1 is a cross-sectional view illustrating a solid electrolytic capacitor according to one exemplary embodiment of the present disclosure.
Figure 2A:
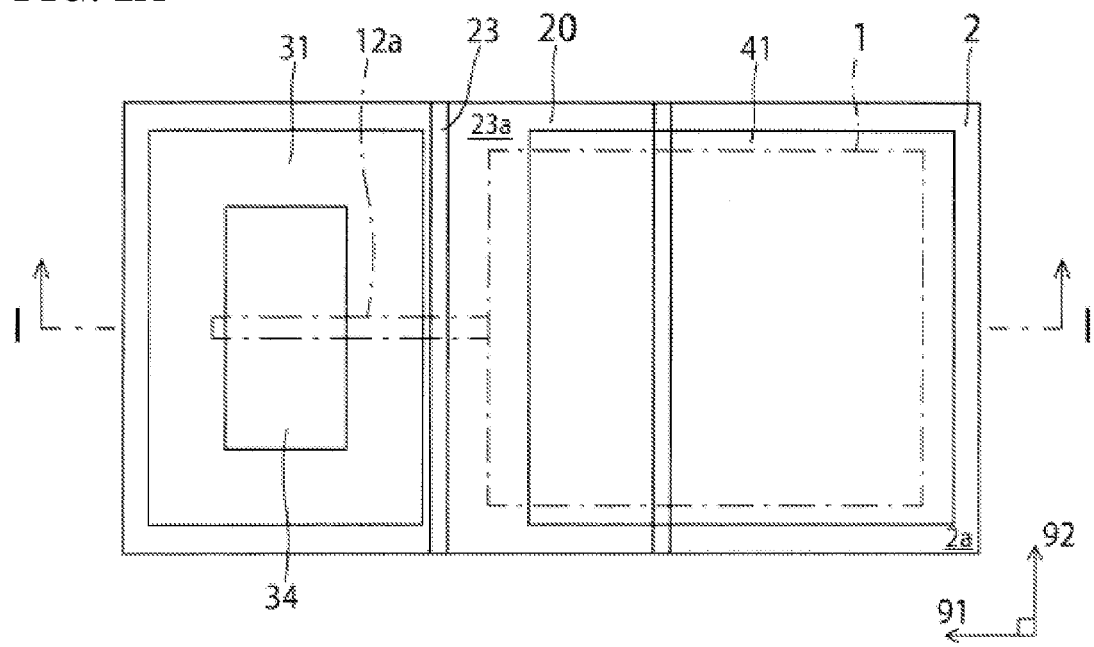
FIG. 2A is an upper surface view illustrating the solid electrolytic capacitor according to the exemplary embodiment.
Figure 2B:
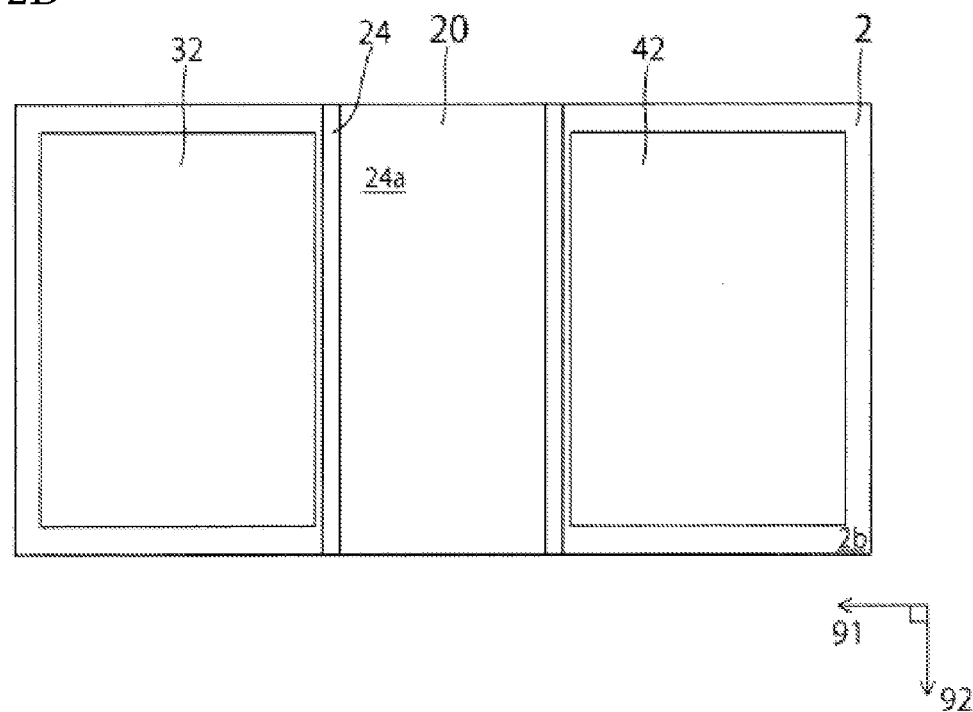
FIG. 2B is a lower surface view illustrating the solid electrolytic capacitor according to the exemplary embodiment.

FIG. 1 is a cross-sectional view illustrating a solid electrolytic capacitor according to one exemplary embodiment of the present disclosure. FIGS. 2A and 2B are an upper surface view and a lower surface view illustrating the solid electrolytic capacitor according to this exemplary embodiment, respectively. In addition, FIG. 1 is a cross-sectional view taken along a line I-I illustrated in FIG. 2A. As illustrated in FIG. 1, the solid electrolytic capacitor includes capacitor element 1, insulating substrate 2, positive electrode lead-out structure 3, negative electrode lead-out structure 4, and exterior body 5.

Capacitor element 1 has positive electrode body 11, positive electrode lead 12, dielectric layer 13, electrolytic layer 14, and negative electrode layer 15. Positive electrode body 11 includes a conductive porous sintered body. Positive electrode lead 12 includes a conductive wire. Positive electrode lead 12 is embedded into positive electrode body 11, and a part (lead-out portion 12a) of positive electrode lead 12 is drawn out of an outer peripheral surface of positive electrode body 11.

As a conductive material for positive electrode body 11 and positive electrode lead 12, the same kind or different kinds of material are used. The conductive material includes a valve metal such as titanium (Ti), tantalum (Ta), aluminum (Al), or niobium (Nb). Especially, titanium (Ti), tantalum (Ta), aluminum (Al), or niobium (Nb) is a suitable material to be used because its oxide (dielectric layer 13) has a high dielectric constant. Furthermore, the conductive material may be an alloy including at least two kinds of valve metals, an alloy including the valve metal and another material, or an alloy containing the valve metal as its major component.

Dielectric layer 13 is formed on a surface of positive electrode body 11 including the conductive material. More specifically, dielectric layer 13 is an oxide film formed by oxidizing the surface of the positive electrode body 11 including the conductive material. Therefore, dielectric layer 13 is formed on an outermost peripheral surface of positive electrode body 11, and on inner peripheral surfaces of fine holes formed in positive electrode body 11. In FIG. 1, dielectric layer 13 is schematically illustrated to be formed only on the outermost peripheral surface of positive electrode body 11.

Electrolytic layer 14 is formed on a surface of dielectric layer 13. More specifically, electrolytic layer 14 is formed on an outermost peripheral surface of dielectric layer 13, and on inner surfaces of the fine holes in positive electrode body 11. An electrolytic material for electrolytic layer 14 may be a conductive inorganic material such as manganese dioxide, or a conductive organic material such as tetracyano-quinodimethane (TCNQ) complex salt or conductive polymer. Furthermore, the electrolytic material is not limited to the conductive inorganic material and the conductive organic material, and includes various kinds of materials.

Negative electrode layer 15 is formed on an outermost peripheral surface of electrolytic layer 14. More specifically, negative electrode layer 15 comprises a carbon layer (not shown) formed on the outermost peripheral surface of electrolytic layer 14, and a silver paint layer (not shown) formed on an outer peripheral surface of the carbon layer. In addition, negative electrode layer 15 is not limited to this, and any kind of material may be used as long as negative electrode layer 15 has function collecting electricity.

As described above, positive electrode body 11 and positive electrode lead 12 serve as a positive electrode member of capacitor element 1, electrolytic layer 14 and negative electrode layer 15 serve as a negative electrode member of capacitor element 1, and dielectric layer 13 serves as a dielectric member of capacitor element 1. Furthermore, a metal foil sheet or metal plate including the above valve metal may be used as the positive electrode member.

Insulating substrate 2 includes an electrical insulating material such as polyimide or glass epoxy, and provided separately from exterior body 5 that are described below. Insulating substrate 2 has upper surface 2a and lower surface 2b, and capacitor element 1 is disposed on upper surface 2a in such a manner that extending direction 91 of positive electrode lead 12 becomes parallel to a horizontal region of upper surface 2a.

Insulating substrate 2 has step portion 20 made up of recessed surface 23 formed by recessing upper surface 2a and projected surface 24 formed by projecting lower surface 2b. More specifically, step portion 20 is formed in insulating substrate 2 so as to face main body portion 10 of capacitor element 1. Here, main body portion 10 means capacitor element 1 except for lead-out portion 12a.

According to this exemplary embodiment, recessed surface 23 has flat bottom surface 23a spreading in a horizontal direction. Thus, as illustrated in FIG. 2A, recessed surface 23 and bottom surface 23a extend in direction 92 roughly perpendicular to extending direction 91 of positive electrode lead 12, from an end of upper surface 2a of insulating substrate 2 to its opposite-side end. In addition, projected surface 24 has a flat lowermost surface 24a spreading in the horizontal direction. Thus, as illustrated in FIG. 2B, projected surface 24 and lowermost surface 24a extend in direction 92 from an end of lower surface 2b of insulating substrate 2 to its opposite-side end. Furthermore, recessed surface 23 may have a level difference at the end of upper surface 2a in direction 92. In addition, projected surface 24 may have a level difference at the end of lower surface 2b in direction 92.

Furthermore, as illustrated in FIGS. 1 and 2B, projected surface 24 is disposed in a region between a formation region of positive electrode terminal 32 and a formation region of negative electrode terminal 42 that are described below, in lower surface 2b of insulating substrate 2. Thus, lowermost surface 24a of projected surface 24, lower surface 32b of positive electrode terminal 32, and lower surface 42b of negative electrode terminal 42 are disposed in the same plane.

Positive electrode lead-out structure 3 is an electrode structure that leads a positive electrode current path connecting positive electrode lead 12 to lower surface 2b of insulating substrate 2. More specifically, positive electrode lead-out structure 3 has first positive electrode connection member 31, positive electrode terminal 32, second positive electrode connection member 33, and pillow member 34. First positive electrode connection member 31 is formed on upper surface 2a of insulating substrate 2. Positive electrode terminal 32 is formed on lower surface 2b of insulating substrate 2. Each of first positive electrode connection member 31 and positive electrode terminal 32 may be a metal foil sheet, metal plate, or plated layer including a metal material such as copper.

Second positive electrode connection member 33 is a positive electrode conductive via penetrating insulating substrate 2 from upper surface 2a to lower surface 2b, and electrically connects first positive electrode connection member 31 to positive electrode terminal 32. More specifically, second positive electrode connection member 33 includes first through hole 21 penetrating insulating substrate 2 from upper surface 2a to lower surface 2b, and conductive material 36 formed in first through hole 21. Thus, conductive material 36 is in contact with lower surface 31b of first positive electrode connection member 31 and upper surface 32a of positive electrode terminal 32. In addition, second positive electrode connection member 33 may be a plated layer including a conductive material and formed on an inner surface of first through hole 21. Furthermore, instead of the positive electrode conductive via, second positive electrode connection member 33 may be formed on a lateral surface of insulating substrate 2 as a plated layer including a conductive material.

Pillow member 34 is interposed between lead-out portion 12a of positive electrode lead 12 and first positive electrode connection member 31, and has top surface 34a electrically connected to lead-out portion 12a, and bottom surface 34b electrically connected to first positive electrode connection member 31. Thus, pillow member 34 electrically connects positive electrode lead 12 to first positive electrode connection member 31. In addition, bottom surface 34b of pillow member 34 is bonded to upper surface 31a of first positive electrode connection member 31 with conductive bonding material 35 such as a solder.

Negative electrode lead-out structure 4 is an electrode structure that leads a negative electrode current path connecting negative electrode layer 15 to lower surface 2b of insulating substrate 2. More specifically, negative electrode lead-out structure 4 has first negative electrode connection member 41, negative electrode terminal 42, and second negative electrode connection member 43. First negative electrode connection member 41 is formed on upper surface 2a of insulating substrate 2 separately from first positive electrode connection member 31. According to this exemplary embodiment, first negative electrode connection member 41 partially spreads to bottom surface 23a of recessed surface 23. Negative electrode terminal 42 is formed on lower surface 2b of insulating substrate 2 separately from positive electrode terminal 32. Each of first negative electrode connection member 41 and negative electrode terminal 42 may be a metal foil sheet, metal plate, or plated layer including a metal material such as copper.

Second negative electrode connection member 43 is a negative electrode conductive via penetrating insulating substrate 2 from upper surface 2a to lower surface 2b, and electrically connects first negative electrode connection member 41 to negative electrode terminal 42. More specifically, second negative electrode connection member 43 includes second through hole 22 penetrating insulating substrate 2 from upper surface 2a to lower surface 2b, and conductive material 36 filling second through hole 22. Thus, conductive material 36 is in contact with lower surface 41b of first negative electrode connection member 41 and upper surface 42a of negative electrode terminal 42. In addition, second negative electrode connection member 43 may be a plated layer including a conductive material and formed in an inner surface of second through hole 22. Furthermore, instead of the negative electrode conductive via, second negative electrode connection member 43 may be formed on a lateral surface of insulating substrate 2 as a plated layer including a conductive material.

Capacitor element 1 is connected to positive electrode lead-out structure 3 and negative electrode lead-out structure 4 as follows. That is, lead-out portion 12a of positive electrode lead 12 is welded to top surface 34a of pillow member 34, whereby positive electrode lead 12 and pillow member 34 are electrically connected to each other. In addition, negative electrode layer 15 and first negative electrode connection member 41 are electrically connected to each other by interposing conductive member 6 therebetween. In addition, according to this exemplary embodiment, conductive member 6 is thickly formed in a portion on recessed surface 23, in first negative electrode connection member 41, compared with a portion opposed to negative electrode terminal 42, in first negative electrode connection member 41.

Exterior body 5 covers capacitor element 1 on upper surface 2a of insulating substrate 2. Meanwhile, exterior body 5 is not formed on lower surface 2b of insulating substrate 2. Thus, lower surface 32b of positive electrode terminal 32 and lower surface 42b of negative electrode terminal 42 constitute lower surface electrodes of the solid electrolytic capacitor. Furthermore, exterior body 5 includes an electrical insulating material functioning as a sealing material such as an epoxy resin or silicone resin.

Next, a detailed description of a method for manufacturing the solid electrolytic capacitor according to this exemplary embodiment is described. According to this exemplary embodiment, a step of forming the insulating substrate, a step of forming the electrodes, a step of disposing the element, and a step of forming the exterior body are executed in this order.

Figure 3:
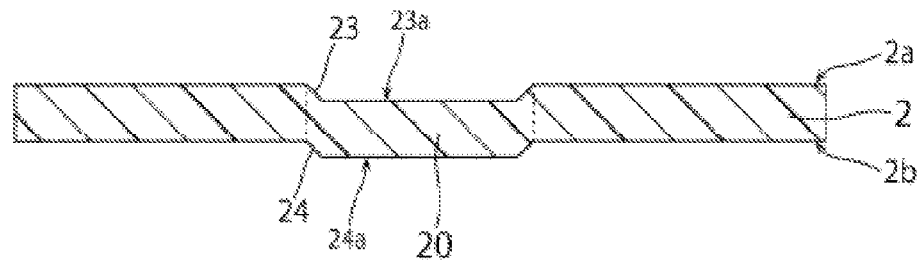
FIG. 3 is a cross-sectional view to be used for describing a step of forming an insulating substrate, the step being executed by a method for manufacturing the solid electrolytic capacitor according to the exemplary embodiment.

FIG. 3 is a cross-sectional view to be used for describing the step of forming the insulating substrate. As illustrated in FIG. 3, in the step of forming the insulating substrate, insulating substrate 2 having above-described step portion 20 is formed. Insulating substrate 2 is formed by a method such as pressing or molding.

Figure 4:
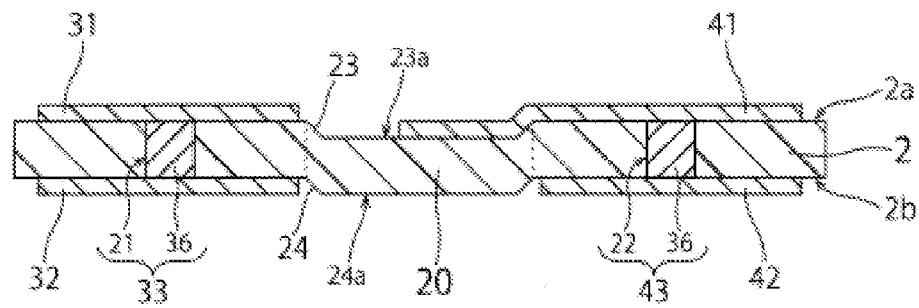
FIG. 4 is a cross-sectional view to be used for describing a step of forming electrodes, the step being executed by the method for manufacturing the solid electrolytic capacitor according to the exemplary embodiment.

In the step of forming the electrodes, positive electrode lead-out structure 3 and negative electrode lead-out structure 4 are formed. FIG. 4 is a cross-sectional view to be used for describing the step of forming the electrodes. As illustrated in FIG. 4, in the step of forming the electrodes, first, positive electrode terminal 32 and negative electrode terminal 42 are formed on lower surface 2b of insulating substrate 2. At this time, in lower surface 2b of insulating substrate 2, a formation region of positive electrode terminal 32 and a formation region of negative electrode terminal 42 are determined so that projected surface 24 of step portion 20 is disposed between those regions. Each of positive electrode terminal 32 and negative electrode terminal 42 is formed by attaching a metal foil sheet or metal plate on lower surface 2b, or performing a plating process on lower surface 2b.

First through hole 21 and second through hole 22 are formed in insulating substrate 2 by etching. After that, first through hole 21 and second through hole 22 are each filled with conductive material 36, whereby second positive electrode connection member 33 and second negative electrode connection member 43 are formed.

Subsequently, plated layers are formed as first positive electrode connection member 31 and first negative electrode connection member 41 by performing a plating process on upper surface 2a of insulating substrate 2 and a surface of conductive material 36. At this time, first negative electrode connection member 41 is formed so that its one portion spreads to bottom surface 23a of recessed surface 23. In addition, first positive electrode connection member 31 or first negative electrode connection member 41 may be formed by attaching a metal foil sheet or metal plate on upper surface 2a of insulating substrate 2. Furthermore, a plating process may be performed on the attached metal foil sheet or metal plate.

Figure 5:
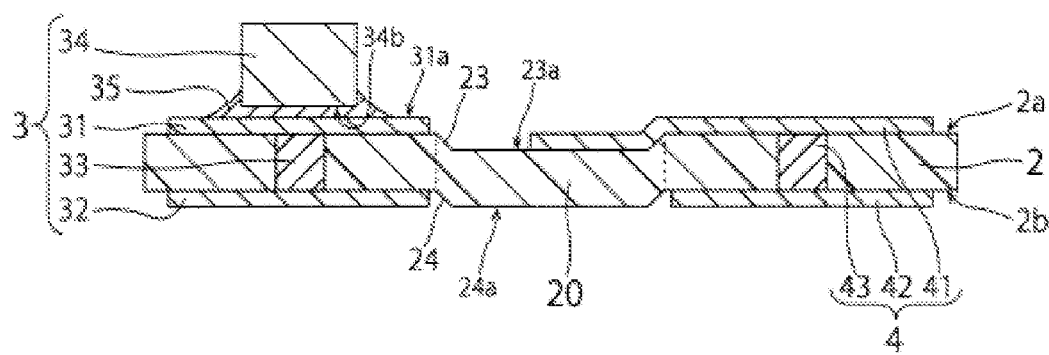
FIG. 5 is a cross-sectional view to be used for describing the step of forming electrodes.

Subsequently, as illustrated in FIG. 5, pillow member 34 is disposed on first positive electrode connection member 31. At this time, bottom surface 34b of pillow member 34 is bonded to upper surface 31a of first positive electrode connection member 31 with conductive bonding material 35 such as a solder.

Figure 6:
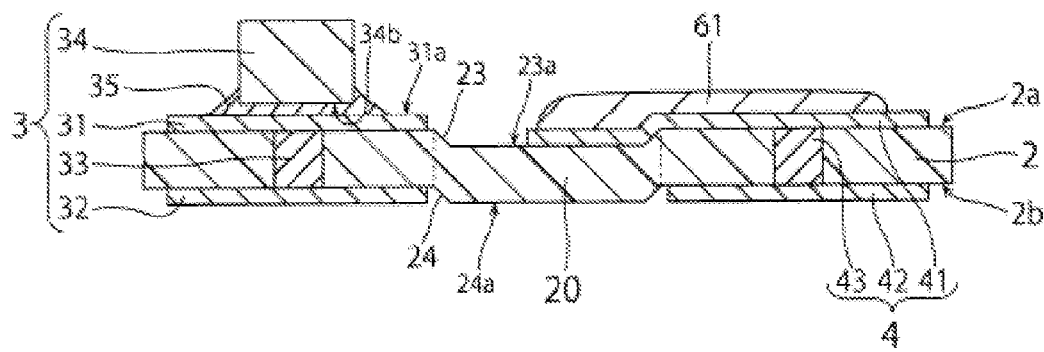
FIG. 6 is a cross-sectional view to be used for describing a step of disposing an element, the step being executed by the method for manufacturing the solid electrolytic capacitor according to the exemplary embodiment.

The step of disposing the element will be described with reference to FIG. 1. In the step of disposing the element, first, a conductive bonding agent such as silver paste is applied to upper surface 41a of first negative electrode connection member 41. After that, capacitor element 1 is disposed on upper surface 2a of insulating substrate 2. At this time, a posture of capacitor element 1 is adjusted so that extending direction 91 of positive electrode lead 12 becomes parallel to the horizontal region of upper surface 2a. In this way, lead-out portion 12a of positive electrode lead 12 comes in contact with top surface 34a of pillow member 34, and negative electrode layer 15 comes in contact with the conductive bonding agent on first negative electrode connection member 41. Thus, a contact surface between positive electrode lead 12 and pillow member 34 is welded, whereby positive electrode lead 12 and pillow member 34 are electrically and physically connected. In addition, after the conductive bonding agent has been cured, the cured conductive bonding agent becomes conductive member 6, and conductive member 6 electrically and physically connects negative electrode layer 15 to first negative electrode connection member 41. Furthermore, when the conductive bonding agent is applied, as illustrated in FIG. 6, conductive bonding agent 61 may be applied more to a portion on recessed surface 23, in first negative electrode connection member 41, than to a portion opposed to negative electrode terminal 42, in first negative electrode connection member 41.

The step of forming the exterior body will be described with reference to FIG. 1. In the step of forming the exterior body, exterior body 5 is molded on upper surface 2a of insulating substrate 2 with a resin such as an epoxy resin. More specifically, exterior body 5 includes a sealing material containing the epoxy resin (base compound), an imidazol compound (curing agent), and silica particles as a filler, and formed by transfer molding. Thus, capacitor element 1 is covered with exterior body 5. In this way, the solid electrolytic capacitor is completed. In addition, instead of the epoxy resin, a silicone resin may be used as the sealing material.

Furthermore, according to this exemplary embodiment, step portion 20 is previously formed in insulating substrate 2 before the execution of the step of forming the electrodes. However, the present disclosure is not limited to this. For example, step portion 20 may be formed in insulating substrate 2 by a process such as pressing after forming positive electrode terminal 32, negative electrode terminal 42, first positive electrode connection member 31, first negative electrode connection member 41, second positive electrode connection member 33, and second negative electrode connection member 43 on insulating substrate 2.

According to the solid electrolytic capacitor, the component material of exterior body 5 is provided in an inside of recessed surface 23 in step portion 20. Therefore, exterior body 5 is thick above step portion 20 because its component material is provided in the inside of recessed surface 23, so that a thermal stress and a mechanical stress can be received by this thick portion when the solid electrolytic capacitor is mounted. In addition, even when a stress is generated in an interface between insulating substrate 2 and exterior body 5 at the time of mounting, the stress is dispersed by recessed surface 23 of step portion 20. Furthermore, since the component material of exterior body 5 is provided in the inside of recessed surface 23 in step portion 20, an anchor effect can be obtained, and as a result, exterior body 5 and insulating substrate 2 can be highly adhered to each other. Therefore, the solid electrolytic capacitor is hardly bent at the time of mounting, so that an internal electric connection defect is hardly generated.

Furthermore, according to the solid electrolytic capacitor, step portion 20 is formed in insulating substrate 2 to face main body portion 10 of capacitor element 1. Therefore, the component material of exterior body 5 provided in the inside of recessed surface 23 in step portion 20 is partially provided between main body portion 10 of capacitor element 1 and insulating substrate 2, so that an amount of the component material is increased between capacitor element 1 and insulating substrate 2. As a result, capacitor element 1 and insulating substrate 2 are more highly adhered to each other.

Furthermore, according to the solid electrolytic capacitor, lowermost surface 24a of projected surface 24, lower surface 32b of positive electrode terminal 32, and lower surface 42b of negative electrode terminal 42 are disposed in the same plane. Therefore, when the solid electrolytic capacitor is mounted on a wiring substrate, a thermal stress and a mechanical stress can be received by projected surface 24 of step portion 20 that comes in contact with a surface of the wiring substrate. As a result, the solid electrolytic capacitor is hardly bent at the time of mounting.

Furthermore, according to the solid electrolytic capacitor, conductive member 6 is thickly formed in the portion on recessed surface 23, in first negative electrode connection member 41, compared with the portion opposed to negative electrode terminal 42, in first negative electrode connection member 41. Therefore, capacitor element 1 and first negative electrode connection member 41 are surely connected by the thick portion.

Figure 7:
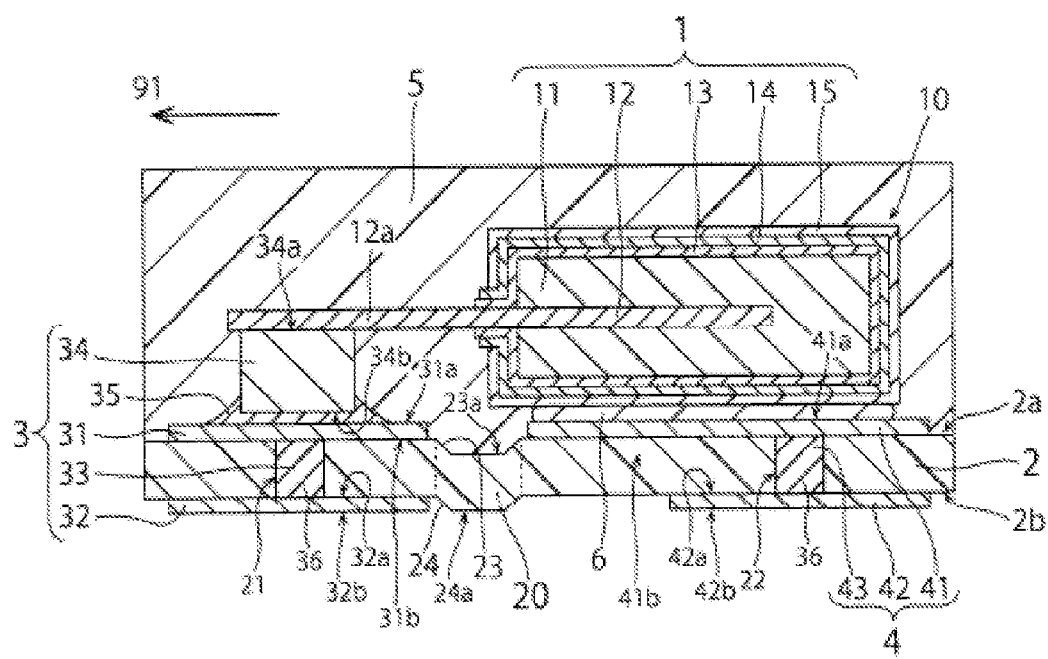
FIG. 7 is a cross-sectional view illustrating a variation of the solid electrolytic capacitor.

FIG. 7 is a cross-sectional view illustrating a variation of the solid electrolytic capacitor. As illustrated in FIG. 7, recessed surface 23 in step portion 20 is preferably disposed between the formation region of first positive electrode connection member 31 and the formation region of first negative electrode connection member 41, in upper surface 2a of insulating substrate 2. According to this configuration, first positive electrode connection member 31 and first negative electrode connection member 41 are not influenced by the level difference of step portion 20. Thus, step portion 20 does not affect a preferable electrical connection between first positive electrode connection member 31 and positive electrode lead 12, and a preferable electrical connection between first negative electrode connection member 41 and negative electrode layer 15.

Furthermore, the configuration in each portion of the present disclosure is not limited to the above exemplary embodiment, and can be variously modified within a technical scope described in claims. According to the above exemplary embodiment, recessed surface 23 in step portion 20 has flat bottom surface 23a, and projected surface 24 in step portion 20 has flat lowermost surface 24a. However, the present disclosure is not limited to this. For example, recessed surface 23 and projected surface 24 may have a curved shape as a whole.

Furthermore, the exemplary embodiment of the present disclosure includes a configuration in which step portion 20 is formed in insulating substrate 2 so as not to face main body portion 10 of capacitor element 1.

What is claimed is:

1. A solid electrolytic capacitor comprising:
    an insulating substrate having an upper surface and a lower surface;
    a capacitor element having a positive electrode member, a negative electrode member, and a dielectric member, and disposed on the upper surface of the insulating substrate;
    a positive electrode lead-out structure having a positive electrode terminal formed on the lower surface of the insulating substrate, and electrically connected to the positive electrode member of the capacitor element;
    a negative electrode lead-out structure having a negative electrode terminal formed on the lower surface of the insulating substrate, a first negative electrode connection member formed on the upper surface of the insulating substrate, and a second negative electrode connection member configured to electrically connect the first negative electrode connection member to the negative electrode terminal, and the negative electrode lead-out structure being electrically connected to the negative electrode member of the capacitor element;
    a conductive member configured to electrically connect the first negative electrode connection member to the negative electrode member of the capacitor element; and
    an exterior body configured to cover the capacitor element on the upper surface of the insulating substrate, wherein:
    the insulating substrate has a step portion made up of a recessed surface and a projected surface, the recessed surface being formed by recessing the upper surface, the projected surface being formed by projecting the lower surface so as to face the recessed surface in the thickness direction of the insulating substrate,
    at least a part of the first negative electrode connection member is disposed on the recessed surface, and
    the first negative electrode connection member has a step portion disposed along the step portion of the insulating substrate.

2. The solid electrolytic capacitor according to claim 1, wherein the insulating substrate is provided separately from the exterior body.

3. The solid electrolytic capacitor according to claim 1, wherein the step portion of the insulating substrate is formed in a part of the insulating substrate facing the capacitor element.

4. The solid electrolytic capacitor according to claim 1, wherein the positive electrode lead-out structure further has a first positive electrode connection member formed on the upper surface of the insulating substrate, and a second positive electrode connection member configured to electrically connect the first positive electrode connection member to the positive electrode terminal.

5. The solid electrolytic capacitor according to claim 1, wherein the projected surface in the step portion, a lower surface of the positive electrode terminal, and a lower surface of the negative electrode terminal are disposed in the same plane.

6. The solid electrolytic capacitor according to claim 1, wherein the conductive member is disposed between the negative electrode member and the part of the first negative electrode connection member which is disposed on the recessed surface.

7. The solid electrolytic capacitor according to claim 6, wherein a thickness of the conductive member on the part of the first negative electrode connection member which is disposed on the recessed surface is greater than a thickness of the conductive member on a part of the first negative electrode connection member which is opposed to the negative electrode terminal.

* * * * *